D. M. DON JIAN.
DEVICE FOR REMOVING AND CURING CORNS.
APPLICATION FILED OCT. 18, 1910.

1,025,903.

Patented May 7, 1912.

Witnesses
Geo. A. Crawford Jr.
T. Brookes

Inventor
Dickran M. Donjian

COLUMBIA PLANOGRAPH CO., WASHINGTON, D. C.

UNITED STATES PATENT OFFICE.

DICKRAN M. DON JIAN, OF WASHINGTON, DISTRICT OF COLUMBIA.

DEVICE FOR REMOVING AND CURING CORNS.

1,025,903. Specification of Letters Patent. Patented May 7, 1912.

Application filed October 18, 1910. Serial No. 587,785.

*To all whom it may concern:*

Be it known that I, DICKRAN MARDIROS DON JIAN, a citizen of the United States, residing at Washington, District of Columbia, have invented a new and useful Device for Removing and Curing Corns, of which the following is a specification, reference being had to the drawings annexed hereto and forming a part hereof.

The invention relates to a device for removing corns by abrasion by means of a stone of the proper texture which may be either natural or artificial, cut or formed into such shape that corns located in any position may be easily and conveniently reached; and which provides means whereby an antiseptic solution may be applied to the corn during the process of removal for the double purpose of aiding in the abrasion and of preventing any contamination, and curing any soreness that may be present or may result from the operation.

This invention relates in general to the type of device which forms the subject of my pending application filed July 11, 1910, Serial No. 571,497; but embodies features which I consider to be an improvement over the devices there disclosed.

The invention is illustrated in the accompanying drawings which form a part of this specification, in which—

Figure 1:
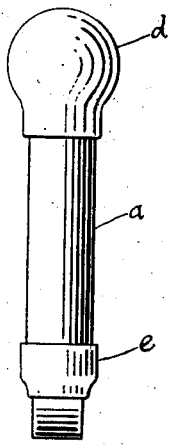
Figure 2:
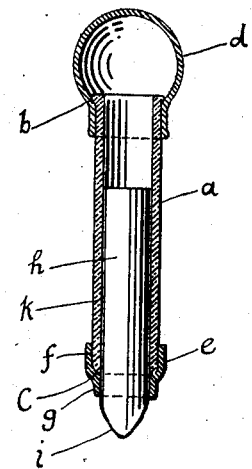
Figure 3:
Figure 4:
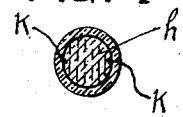

Figure 1 is an elevation of the device; Fig. 2 is a longitudinal section thereof; Fig. 3 is a bottom view, and Fig. 4 is a transverse section through the tube and stone.

In these drawings $a$ is a tubular member which may be formed or molded of glass, although hard rubber or other material may be used. One end of this tube $a$ is preferably formed with a bead $b$ and the other end may be rounded off as shown at $c$, although neither of these features is necessary. Inclosing the end which is provided with the bead $b$ is a bulb of rubber or other elastic material, of suitable size and shape as indicated by $d$. The neck of this bulb tightly encircles the end of the tube so as to form an air-tight joint. The other end of the tube $a$ is encircled by a ring of rubber or similar elastic material, $e$, of a shape such that about half the length of the ring fits around the tube as shown at $f$, and the other half of its length extends beyond the end of the tube and is of an internal diameter slightly smaller than the internal diameter of the tube $a$ as shown at $g$. This ring may be a short length of rubber tube of an internal diameter slightly smaller than the internal diameter of the tube $a$ with half its length stretched so as to encircle the end of the tube $a$.

Fitting slidably into the base of the tube $a$ is a stick $h$ of pumice stone or other abrasive of a suitable character and texture. One end of this abrasive stone projects beyond the end of the tube $a$ and beyond the part $g$ of the rubber ring $e$ which holds it firmly in place and is tapered preferably to a rounded chisel edge $i$. Extending longitudinally along the side of the stone $h$ are one or more grooves or channels $k$ leading from the part of the stone $h$ within the tube $a$ to the flattened face extending beyond the tube and the ring $g$.

When it is desired to use the device the lower end of the stone and tube is dipped into a receptacle containing an antiseptic solution such as hydrogen-peroxid, glycothymoline, a weak solution of carbolic acid, etc., and the bulb $d$ is compressed. The bulb is then allowed to expand and a quantity of the antiseptic solution is drawn into the tube $a$ by suction in a well known manner. The chisel edge of the stone is then rubbed over the corn abrading and removing it in the known manner. The antiseptic solution percolates slowly through the grooves $k$ and moistens or wets the abrading surface which is necessary to the proper operation of the device, and at the same time supplies a germicidal and healing liquid to the parts which prevents contamination and acts as a healing agent. The rubber retaining ring sinks into the grooves and partly closes them, so that they act as valves and no liquid is wasted. If the antiseptic solution does not flow sufficiently a slight compression of the bulb $d$ will cause the rubber ring to yield and increase the flow; and, the device can be entirely emptied after use in the same manner if desired. After the operating surface of the stone has become worn by continued use, the stick *h* may be withdrawn from the tube *a* sufficiently to expose a new portion of stone.

The device is manifestly capable of use in many ways other than that of removing corns and may be of use for any purpose in which it is desired to treat a part of the body by abrasion and at the same time by applying an antiseptic or other treating solution to the part, and I desire it understood that I do not wish to be limited further than necessitated by the scope of the claims appended hereto.

I claim:

1. In a device of the character described, a hollow member provided with an opening, a granular abrasive member held within the said opening with one end projecting therefrom, and grooves in the surface of the said abrasive member to supply an antiseptic solution from the hollow member to the part of the abrasive member projecting therefrom.

2. In a device of the character described, a tubular member, a granular abrasive member held within the tubular member with its end projecting therefrom, and grooves in the surface of said abrasive member to supply an antiseptic solution from the tubular member to the part of the abrasive member projecting therefrom.

3. In a device of the character described, a hollow member provided with an opening, an abrasive stone held within the said opening with one end projecting therefrom, and grooves in the surface of the said abrasive stone to supply an antiseptic solution from the hollow member to the part of the abrasive stone projecting therefrom.

4. In a device of the character described, a tubular member, an abrasive stone held within the tubular member with one end projecting therefrom, and grooves in the surface of the said abrasive stone to supply an antiseptic solution from the tubular member to the part of the abrasive stone projecting therefrom.

5. In a device of the character described, an open-ended tubular member, a longitudinally grooved abrasive stone held therein with its end projecting therefrom, and an elastic bulb on the other end of the tubular member.

6. In a device of the character described, an open-ended tubular member, an abrasive stone held slidably therein, with its end projecting therefrom, an elastic ring encircling the end of the tube and the stone, means providing a passage for liquid from the tube to the projecting end of the stone, and an elastic bulb on the other end of the tubular member.

7. In a device of the character described, an open-ended tubular member, an abrasive stone held therein with one end projecting therefrom, an elastic ring embracing the end of the tube and the stone, a duct extending longitudinally of the stone, and an elastic bulb on the other end of the tubular member.

8. In a device of the character described, an open-ended tubular member, an abrasive stone held therein with one end projecting therefrom and tapered to a dull chisel edge, a duct in the surface of the stone connecting the interior of the tubular member and the projecting end of the stone, and an elastic bulb on the other end of the tubular member.

9. In a device of the character described, an open-ended tubular member, an abrasive stone held therein with one end projecting therefrom and tapered to an edge, longitudinal ducts in the surface of the stone, an elastic ring encircling the end of the tubular member and the projecting end of the stone, and an elastic bulb on the other end of the tubular member.

10. In a device of the character described, an open-ended tubular member, an abrasive stone held slidably therein with one end projecting therefrom and tapered to a dull chisel edge, longitudinal ducts on the surface of the stone extending to the tapered edge and affording communication between the interior of the tube and the said edge of the stone, an elastic ring encircling the end of the tubular member and a part of the projecting end of the stone leaving the tapered part projecting beyond said ring, and an elastic bulb on the other end of the said tubular member.

11. In a device of the character described, a tubular member, an abrasive stone held slidably therein, with one end projecting therefrom, an elastic ring embracing the end of the tube and the stone and a groove extending longitudinally in the surface of the stone.

12. In a device of the character described, a tubular member, an abrasive stone held slidably therein with one end projecting therefrom, a groove extending longitudinally in the surface of the stone, and means comprising an elastic ring to provide a liquid tight connection except for said groove, between the tubular member and the stone.

13. In a device of the character described, a tubular member, an abrasive stone held slidably in the bore thereof with one end extending therefrom, longitudinal grooves in the surface of the stone, means comprising an elastic ring to provide a liquid tight connection except for said grooves, between the tubular member and the stone, and an elastic bulb on the other end of the tubular member.

14. In a device of the character described an open ended tubular member, an abrasive stone held slidably therein with one end projecting therefrom, an elastic ring embracing the end of the tube and the stone, means providing a passage for liquid from the tube to the projecting end of the stone, and a closure for the other end of the tubular member.

In testimony whereof, I affix my signature in the presence of two witnesses.

DICKRAN M. DON JIAN.

Witnesses:
　Geo. A. Crawford, Jr.,
　F. Brookes.

Copies of this patent may be obtained for five cents each, by addressing the "Commissioner of Patents, Washington, D. C."